UNITED STATES PATENT OFFICE.

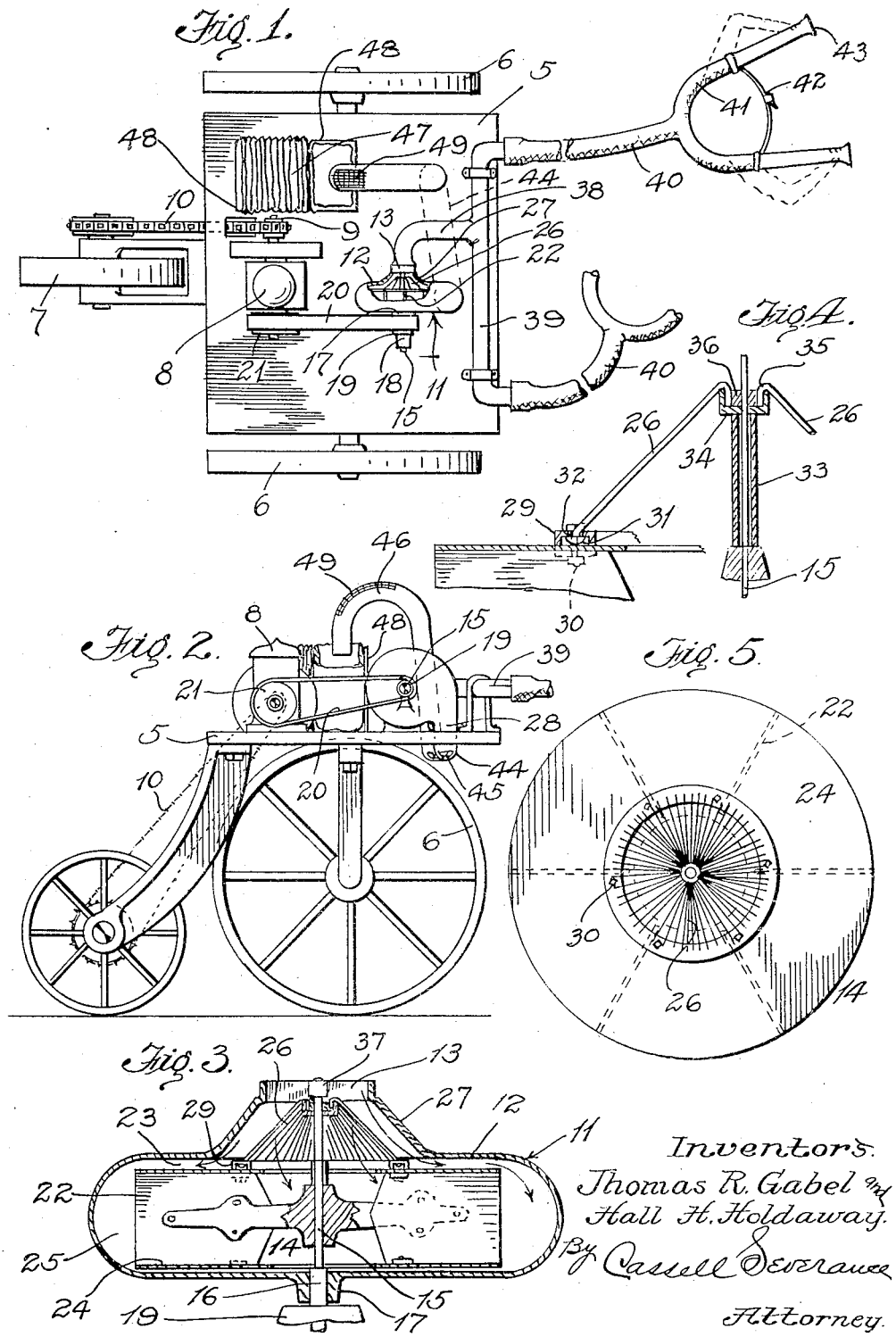

THOMAS RING GABEL AND HALL H. HOLDAWAY, OF LOS ANGELES, CALIFORNIA, ASSIGNORS OF TWO-THIRDS TO HENRY P. JONES, OF LOS ANGELES, CALIFORNIA, AND ONE-THIRD TO SAID GABEL.

COTTON-PICKER MECHANISM.

1,348,829.  Specification of Letters Patent.  Patented Aug. 3, 1920.

Application filed December 16, 1916. Serial No. 137,304.

*To all whom it may concern:*

Be it known that we, THOMAS RING GABEL and HALL H. HOLDAWAY, citizens of the United States, residing at Los Angeles, in the county of Los Angeles and State of California, have invented certain new and useful Improvements in Cotton-Picker Mechanism, of which the following is a specification.

This invention relates to improvements in picking machines, and has particular relation to machines adapted to pick cotton or other products or seeds, which must be taken directly from the vegetation producing the same.

It is an object of the invention to provide a product picking device, and particularly a cotton picking machine in which a suction fan or blower may be used to draw the cotton or like material, and force it to a suitable point for collection, a by-pass mechanism being employed for preventing the cotton or other materials from engaging the paddles of the fan.

It is also an object of the invention to provide a machine adapted to be moved through the fields to be picked, and to equip the same with a by-pass blower having suitable nozzle means connected therewith, and a suitable machine for driving the same.

It is a further object of the invention to provide a cotton or other product picking machine, having a suitable blower adapted to create a suction in collecting pipes, an inclined fending means being supplied for preventing the cotton or other materials picked from being struck by the vanes of the blower and injured thereby.

It is also a further object of the invention to provide a product picking blower or fan arranged to utilize the combined action of the suction produced, and the centrifugal force generated in treating fibrous or other products, such for instance, as cotton, whereby the cotton may be picked by the suction, and prevented by the action of centrifugal force from injury by the vanes of the blower as the material passes through the same.

With these and other objects in view, the invention comprises certain novel constructions, combinations, and arrangements of parts, as will be hereinafter more fully described and claimed.

In the accompanying drawing forming a part of this specification:—

Figure 1 is a top plan view of a picking machine constructed in accordance with this invention.

Fig. 2 is a side elevation of the same.

Fig. 3 is a horizontal central sectional view taken through the blower or fan used in producing the suction required for the picking of the cotton or other products.

Fig. 4 is a fragmentary sectional view upon an enlarged scale showing a portion of the fan used in the blower with the detail of the fending or by-pass wires used.

Fig. 5 is a side elevation of the fan looking at the same from the side upon which the by-pass mechanism is mounted.

The picking machine forming the subject matter of this invention is designed to afford a device in which certain vegetable products may be picked from the plants, as for instance, cotton or the like, and especially where it is desired to pass the materials through a suction device, as a fan or blower, without the danger of tearing or breaking the fibrous portions of certain kinds of products, and particularly cotton. In the use of blowers in picking cotton, it has been difficult to prevent injury to the fiber of the cotton or seed, usually when the cotton came in contact with the fan or moving part of the blower. By the use of the device forming the subject matter of this invention, the suction produced by the fan is expended upon the cotton or other product picked, but the cotton is prevented from being struck and injured by the blades of the fan. In fact the cotton is drawn in and passed through the blower by means of the suction, but is by-passed around the fan portion of the blower.

The details and features of the invention will now be more specifically described, reference being had to the accompanying drawing, in which 5 indicates the platform of a vehicle of any desired type. The vehicle is mounted upon wheels 6 and 7, preferably spaced so as to pass between the rows of plants to be treated, as for instance, cotton plants. The details of the vehicle are not essential and may be varied in any desired way.

Mounted upon the platform 5 of the vehicle is an engine 8 of any desired type, but for convenience and economy in operation, the engine is usually of the internal combustion type. The shaft 9 of the engine may be connected by a sprocket chain 10 with one of the shafts of the vehicle for propelling the same if desired.

A suitable distance from the engine 8 is mounted a blower 11, the construction of which forms an important feature of the invention. As shown in the drawing, the said blower is provided with a blower casing 12 having an inlet opening 13 upon one side and opposite the central portion thereof. Within the casing is a blower fan 14, the hub of which is fastened to a shaft 15, which forms an extension of a rotor shaft 16 projecting through the closed side of the casing and mounted in suitable bearings at 17 and 18. A pulley 19 is secured to said shaft 16 between the said bearings 17 and 18, and is connected by a suitable member 20 with a pulley 21 fastened upon the shaft of the engine 8.

The fan 14 is provided with a number of vanes 22, which are made of a little less width than the width of the casing 12, and especially leaving a suitable space 23 between one wall of the casing 12 and one side of the fan, the space being sufficient to permit the passage of the cotton or other product drawn in by the blower. Upon one side of the vanes 22 is an annular plate 24 which is secured upon the edges of the vanes upon the side of the fan next to the space 23. The plate 24 is formed with a central opening of ample size to admit a volume of air drawn in by the suction produced in rotating the fan. The casing 12 is of a somewhat larger diameter than the fan, so that a large peripheral passage 25 extends entirely around the fan, thus permitting cotton or other products to be moved through the blower, without having to engage the paddles of the vanes of the fan. The suction produced by the rotation of the fan tends to draw the air in through the side of the casing 12 and through the opening in the center of the plate 24, and the cotton or other product would follow this course to a large extent and thus come in contact with the blades.

To prevent such an action, a product fending or by-pass structure is employed, preferably made up of a series of radially arranged members or wires 26, which are inclined with respect to the said plate 24, and extend from points upon said plate near the central opening thereof, outwardly and in an inclined direction toward the outer end of the shaft 15. The casing 12 is enlarged and formed with a frusto-conical portion 27 in order to accommodate these fending members or by-pass wires 26 as clearly shown in Fig. 3. A sufficient number of inclined fender members 26 are used, and placed sufficiently close together to prevent the small balls or wads of cotton drawn from the bolls from passing between them, and thus entering the central part of the fan. The inclination of the wires thus diverts the cotton and directs it toward the surface of the plate 24, and the action of centrifugal force also assists in this movement. As soon as the cotton reaches the plate 24, it is released of the suction which tends to draw it in the fan, and is forced through the passage 23 into the peripheral passage way 25 of the blower where it is kept away from the blades by the centrifugal movement of the air under the impulse of the vanes until it finds an outlet at the exit portion 28 of the said blower. The entrance of all of the air together with any of the materials which it may be carrying, is of course, through the opening 13 leading into the frusto-conical portion 27 and thereby into the casing 12.

The fending inclined members 26 may be mounted in any desired form, but are preferably held in position by a circular channel ring 29, which is fastened usually by bolts at 30 to the outer face of the plate 24. The wires may be made with heads 31, arranged inside the channel ring 29, the said wires projecting through openings 32 at suitable intervals. A shaft inclosing casing or sleeve 33 projects from the end of the fan hub outwardly around the shaft 15, and supports a flanged member 34 which bears against the end of said casing or sleeve 33, as clearly shown in Fig. 4. The outer ends of the members or wires 26 are bent inwardly to form hooks 35, which overhang the flange upon the member 34 as shown in Fig. 4. A collar or band 36 slipped inwardly upon the shaft 15 will hold the hooked portions 35 firmly in the flanged member 34. A bracket supported in the opening 13 of the casing carries a bearing 37, which engages the outer end of the shaft 15 and prevents any vibration at that point.

It will be readily understood that the members or wires 26 may be arranged as closely together as desired for preventing the wads of cotton entering the device from passing between them, and yet permitting the air under the suction of the blower to pass through.

It will also be evident that the arrangement of the fender members may be altered and considerably changed, and that crossed wires or diagonally arranged wires or members may be used all within the spirit and scope of the invention.

It will also be understood that the device may be used to take products from different kinds of plant life, and may be applied to the collecting and picking of anything that can be drawn into the blower and passed on therefrom.

The blower inlet is connected with any suitable nozzle mechanism, such as for instance, as has been illustrated in the drawing. In such illustration, the inlet of the blower is connected by a pipe 38 with a transverse suction pipe 39, having flexible piping or hose 40 applied to the ends thereof. Branch piping as 41 may be connected with the hose 40, and may be secured around the body of the picker by means of an adjustable band or strap 42. Picking nozzles 43 of any desired type are forced upon the end of the branch piping 41. The nozzles are applied to the cotton or other plants and the engine being set in operation will operate the blower for drawing in the cotton or other products, as the nozzles are applied to the plants.

The materials are drawn through the blower and forced downwardly through curved piping 44, preferably provided with a screen 45 in the walls thereof, thus permitting of the cleaning of the cotton or other materials, of dust, leaves, or foreign materials. The discharge pipe then passes upwardly and is formed with a curved upper portion 46 adapted to direct the cotton or other materials into bags 47, supported by any suitable bag holding arms or mechanism 48, and the bags are pulled open one at a time beneath the end of the discharge pipe 46 for receiving the cotton picked. The curved portion 46 of the discharge pipe is also usually provided with a screened opening 49 for further cleaning the materials passing through the discharge pipe.

It will be evident that the arrangement of the suction piping may be considerably altered without departing from the spirit of the invention, and that any type of bag holding means desired may be employed. Any kind of picking nozzles may also be used as found preferable.

What is claimed is:—

1. In a cotton picking machine, a suction blower casing having a central inlet opening and a peripheral outlet, a fan in said casing and arranged to provide a space between the fan and the entrance side wall of said casing, a plate on the side of said fan with an opening therethrough in register with the opening into said casing, and a conical fender over said opening formed of smooth wires extended, at a space apart, from the outer small end of said conical fender to the inner edge of the side plate and projecting outwardly into the opening into said casing and forming a smooth deflecting guide for matter entering said opening whereby to guide it outwardly between the plate on the side of said fan and the inside wall of said fan casing, substantially as shown and described.

2. A blower fan having an inclosed housing, and having a plate applied to the edges of its fan blades, wires connected with the said plate so as to cover the central part of the fan, a flanged member secured to the hub portion of the fan, said wires having hooks engaging the flange of said member, a securing collar for fastening said hooks upon said flange, and means for directing materials under the action of suction to the fan, the said wires operating to fend off and by-pass the materials under the action of the suction so as to not be struck by the vanes of the fan.

In testimony whereof we have hereunto set our hands, in presence of two witnesses.

THOMAS RING GABEL.
HALL H. HOLDAWAY.

Witnesses:
D. P. KENDRICK,
CASSELL SEVERANCE.